United States Patent
Woutters et al.

(10) Patent No.: US 9,926,424 B2
(45) Date of Patent: *Mar. 27, 2018

(54) USE OF POLYUREA NANOPARTICLES AS PERFORMANCE MODIFIERS IN POLYURETHANE MATERIALS

(71) Applicant: Huntsman International LLC, The Woodlands, TX (US)

(72) Inventors: Steve Andre Woutters, Deurne (BE); Christopher Ian Lindsay, Tervuren (BE)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 312 days.

This patent is subject to a terminal disclaimer.

(21) Appl. No.: 14/413,238

(22) PCT Filed: Jun. 28, 2013

(86) PCT No.: PCT/EP2013/063664
§ 371 (c)(1),
(2) Date: Jan. 7, 2015

(87) PCT Pub. No.: WO2014/012769
PCT Pub. Date: Jan. 23, 2014

(65) Prior Publication Data
US 2015/0291757 A1    Oct. 15, 2015

(30) Foreign Application Priority Data
Jul. 17, 2012 (EP) ..................................... 12176739

(51) Int. Cl.
| | | |
|---|---|---|
| *C08J 9/12* | (2006.01) | |
| *C08G 18/76* | (2006.01) | |
| *C08G 18/08* | (2006.01) | |
| *C08G 18/10* | (2006.01) | |
| *C08G 18/28* | (2006.01) | |
| *C08G 18/32* | (2006.01) | |
| *C08G 18/50* | (2006.01) | |
| *C08G 18/40* | (2006.01) | |
| *C08G 71/02* | (2006.01) | |
| *C08G 101/00* | (2006.01) | |

(52) U.S. Cl.
CPC .......... *C08J 9/125* (2013.01); *C08G 18/0876* (2013.01); *C08G 18/10* (2013.01); *C08G 18/2865* (2013.01); *C08G 18/3234* (2013.01); *C08G 18/409* (2013.01); *C08G 18/5024* (2013.01); *C08G 18/7671* (2013.01); *C08G 71/02* (2013.01); *C08G 2101/005* (2013.01); *C08G 2101/0008* (2013.01); *C08G 2101/0083* (2013.01); *C08J 2375/08* (2013.01)

(58) Field of Classification Search
CPC ................ C08G 18/0876; C08G 18/10; C08G 18/2865; C08G 18/3206; C08G 18/3234; C08G 18/409; C08G 18/5024; C08G 18/6674; C08G 18/7671; C08G 71/02; C08G 2101/0008; C08G 2101/005; C08G 2101/0083; C08J 9/125; C08J 2375/088
See application file for complete search history.

(56) References Cited

U.S. PATENT DOCUMENTS

| | | | | |
|---|---|---|---|---|
| 3,728,301 A | * | 4/1973 | Spence ................. | B01F 17/005 106/316 |
| 5,068,280 A | | 11/1991 | Pal et al. | |
| 9,102,795 B2 | * | 8/2015 | Woutters ............ | C08G 18/0852 |
| 2003/0158280 A1 | | 8/2003 | Daunch et al. | |
| 2006/0128885 A1 | | 6/2006 | Rische et al. | |
| 2007/0203288 A1 | * | 8/2007 | Dorr .................... | C08G 18/283 524/589 |
| 2013/0281584 A1 | * | 10/2013 | Woutters ............ | C08G 18/0852 524/113 |
| 2016/0311965 A1 | * | 10/2016 | Shen .................. | C08G 18/0876 |

FOREIGN PATENT DOCUMENTS

| | | | |
|---|---|---|---|
| WO | 2009/098226 | | 8/2009 |
| WO | WO 2009/098226 | * | 8/2009 |
| WO | 2010/057937 | | 5/2010 |
| WO | 2012/095236 | | 7/2012 |

OTHER PUBLICATIONS

Priester, R.D., et al.; "High Resiliency Polyurea Foam—An Improved Flexible Foam Matrix"; Journal of Cellular Plastics; vol. 30; pp. 144-163; Mar. 1994.

Gier, D.R., et al.; "Fillers, Hard Phases and Copolymer Polyols—Their Different Mechanism to Reinforce Flexible Polyurethane Foams"; Polyurethanes Expo '98; pp. 227-237; Sep. 17-20, 1998.

Armistead, James Paul, et al.; "Morphology of Water-Blown Flexible Polyurethane Foams"; Journal of Applied Polymer Science, vol. 35, pp. 601-629; 1988.

* cited by examiner

*Primary Examiner* — John Cooney
(74) *Attorney, Agent, or Firm* — Huntsman International LLC; Robert Diaz (57) ABSTRACT

Nano-sized polyurea particles or a dispersion of polyurea particles suitable for improving the mechanical properties of a polyurethane material, said particles having at least equivalent diameter dimensions in the nanosize range of 50 nm up to 700 nm, a uniform equivalent diameter particle size distribution, an amount of urethane bonds calculated on the total amount of urea+urethane bonds in said particles of <1%, and a glass transition temperature (Tg) of >100° C., preferably Tg>120° C., more preferably >150° C. measured in a second heating cycle after heating to >220° C. at 20° per minute using Differential Scanning calorimetry.

18 Claims, 1 Drawing Sheet

USE OF POLYUREA NANOPARTICLES AS PERFORMANCE MODIFIERS IN POLYURETHANE MATERIALS

This application is the National Phase of International Application PCT/EP2013/063664 filed Jun. 28, 2013 which designated the U.S. and which claims priority to Foreign Application No. 12176739.6 filed Jul. 17, 2012. The noted applications are incorporated herein by reference.

FIELD OF INVENTION

The present invention relates to particulate material and/or dispersions of particulate material.

More particularly, the present invention relates to particulate material in the form of fine polyurea particles, preferably having nano-size dimensions (nano-particles) and their use in the production process for making polyurethane comprising materials.

Said polyurea particles are used as performance modifiers in the production process for making polyurethane flexible foams (slabstock or moulded) and polyurethane elastomers. More particularly said polyurea particles are used to improve mechanical properties such as tear strength, modulus and compression hardness.

BACKGROUND OF THE INVENTION

Processes for preparing a flexible polyurethane foam by reacting a polyisocyanate, one or more polyether polyols and water have been described widely.

Flexible polyurethane foams often do not have sufficient load-bearing properties. In order to provide such foams with enhanced load-bearing properties often polyols are used which contain particulate materials dispersed therein. Examples of such polyols are so-called SAN-based polymer polyols, PIPA-polyols and PHD-polyols. If the particulate material has particles with a rather big average particle size (micron-sized particles), only a low surface area and limited interfacial interaction per weight unit is achieved. As a consequence of the low surface area and limited interfacial interaction only a low potential for mechanical reinforcement per weight unit may be achieved.

In the prior art, polyurethane/polyurea particles, in particular polyurethane/polyurea nano-particles are disclosed. As an example, US2006/0128885A1 discloses a method to make polyurethane-polyurea particles having two discrete maxima in the particle size distribution, consisting of at least two discrete steps, performed in batch mode. In a first step, amines carried in water are added to a prepolymer, i.e. the reaction product of polyisocyanate and a polyol, which polyisocyanate is carried in acetone. After the initial reaction, water is added to complete the forming of polyurethane-polyurea particles. In a further step, the large amount of acetone is to be evaporated EP 418039 discloses a process for preparing PIPA-polyol and a process for preparing flexible polyurethane foams using such PIPA-polyol. The PIPA particles have a size falling into two discrete ranges of 100-700, preferably 100-400 and more preferably of 100-200 nm on the one hand and of 200-more than 1000, preferably up to 1000, more preferably up to 800 nm on the other hand. Example 2, sample 7 showed a particle size of 800 and of more than 1000 nm. When the experiment was repeated the average particle size was determined at 1.7 µm.

The formation of relatively small (up to 0.3 µm) urea aggregates in flexible polyurethane foam preparation in itself is known; see Journal of Applied Polymer Science, Vol. 35, 601-629 (1988) by J. P. Armistead et al. and Journal of Cellular Plastics, Vol. 30, page 144, (March 1994) by R. D. Priester et al.

Until recently it was believed that by increasing the urea hard phase content other important properties like resiliency, hysteresis and compression set will suffer; see Polyurethanes Expo '98, 17-20 Sep. 1998, page 227 by D. R. Gier et al.

EP1305352, discloses in-situ formed particulate material having a relatively large average particle size and comprising urea and urethane groups.

The state of the art particulate materials are particles having polyurethane and polyurea groups, have rather large particle diameters and rather non-uniform particle size distribution which gives limitation towards their applicability as reinforcement additives in formulations used to make up a polyurethane foam. The limited effect is due to a significant smaller surface area and hence interfacial interaction with the (foam) matrix and also the process for forming the foams may be negatively influenced.

The process for forming the foams is more likely to be influenced with particulate materials with small particle diameters, because of the large surface area.

SUMMARY OF THE INVENTION

It is an object of the present invention to improve the mechanical properties of a polyurethane material by using the polyurea nanoparticles according to the invention. Said polyurea particles having almost no urethane groups and having a narrow equivalent diameter particle size distribution.

More particularly it is the object of the invention to use said polyurea particles to improve the mechanical properties of a polyurethane flexible foam and a polyurethane elastomer. Said foam may be produced according to a slabstock or a moulding process.

The above objective is accomplished by method according to the present invention.

The present invention discloses nano-sized polyurea particles or dispersions of nano-sized polyurea particles which are suitable for improving the mechanical properties of a polyurethane material. Said particles characterized as having:
- Equivalent diameter dimensions in the nanosize range of 50 nm up to 700 nm, and
- a narrow equivalent diameter particle size distribution wherein $d_{90}-d_{10}/d_{50}<3$, preferably <2, most preferably <1.5 and wherein $d_{90}$ is the particle size corresponding to the $90^{th}$ percentile of the cumulative volume distribution, $d_{10}$ is the particle size corresponding to the $10^{th}$ percentile of the cumulative volume distribution and $d_{50}$ is the particle size corresponding to the median of the cumulative volume distribution, and
- a ratio of urea bonds to urethane bonds in said particles of at least 90:10, more preferably 99:1, most preferably the amount of urethane bonds calculated on the total amount of urea+urethane bonds in said particles is <1%, and
- a glass transition temperature (Tg) of >100° C., preferably Tg>120° C., more preferably >150° C. measured in a second heating cycle after heating to >220° C. at 20° per minute using Differential Scanning calorimetry.

According to some embodiments, a dispersion of polyurea particles is used. Said dispersion is preferably having 0.5 wt % up to 50 wt % of particles in a suitable solvent, preferably 1 wt % up to 30 wt %, more preferably 5-20 wt %.

The nano-sized polyurea particles according to the invention are fabricated using a polyisocyanate component, a mono-amine component and a diamine component.

More particularly, the nano-sized polyurea particles according to the invention are fabricated by adding an isocyanate-reactive monoamine component to a polyisocyanate component thereby forming an urea-modified polyisocyanate component optionally dissolved in a solvent, and then adding said urea-modified polyisocyanate component to a diamine component thereby forming the urea particles (optionally dispersed in a solvent medium).

The use of specific diamine compounds and the order (sequence) of combining the different ingredients are crucial in order to achieve the polyurea particles according to the invention.

The monoamine components to be used in the process for forming the polyurea particles are selected from alkylpolyoxyalkyl monoamines represented by following general structure [1]:

wherein
  $A_1$ typically is a C1 to C6 chain, most preferably a $CH_3$-group.
  $A_2$, $A_3$ and $A_4$ typically are mutually different C1 to C6 chains, most preferably at least one of them being a C2-chain, at least one being a branched C3-chain and at least one being a straight C3-chain.
  n, m and p independently are a positive integers, at least one of them being more than zero.
  $A_1$ may be $C_9H_{19}$-Ø-, wherein Ø is an aromatic C6-ring.

According to embodiments, the ratio of isocyanate groups in the polyisocyanate component calculated over the total number of reactive hydrogens in the monoamine component and diamine component is in the range of 80 up to 120, more preferably in the range of 90 up to 110, most preferred 99 up to 101.

According to embodiments, the ratio of isocyanate groups in the polyisocyanate component over the number of primary and secondary amine groups in the monoamine component is in the range of 1.6 up to 120, more preferably in the range of 10 up to 70 and most preferred in the range 20 up to 40.

Suitable solvents to use in the process for forming the polyurea particles according to the invention include ketones such as acetone, tetrahydrofuran (THF), toluene, . . . and polyols which are reactive towards isocyanates at temperatures above 60° C.

Furthermore, a process for forming a polyurethane material is disclosed thereby making use of the nano-sized polyurea particles of the invention.

According to embodiments, a process for forming a flexible polyurethane foam is disclosed. Said polyurethane flexible foam preferably having a free rise density lower than 100 kg/m³, preferably in the range of 30-60 kg/m³ and said method comprising reacting at an ISO index in the range of 95-125:
  a polyisocyanate composition;
  an isocyanate-reactive composition;
  nano-sized polyurea particles and/or a dispersion of nano-sized particles,
  a blowing agent,
  catalysts, and
  optionally additives such as fire retardants, surfactants,
  such that the amount (wt %) of polyurea particles in the obtained flexible foam is in the range of minimum 1% up to maximum 10 wt %, preferably in the range 1-5 wt % calculated on the total weight of the flexible foam.

According to embodiments a process for forming an elastomeric polyurethane material (elastomer) is disclosed. Said polyurethane elastomer preferably having a density in the range of 200-1200 kg/m³ and said method comprising reacting at an ISO index in the range of 95-125
  a polyisocyanate composition;
  an isocyanate-reactive composition;
  nano-sized polyurea particles and/or a dispersion of nano-sized particles,
  optionally a blowing agent,
  catalysts, and
  optionally additives such as fire retardants, surfactants,
  such that the amount (wt %) of polyurea particles in the obtained elastomer is in the range of minimum 1% up to maximum 10 wt % preferably in the range 0.5-10 wt %, more preferably in the range 1-7 wt % calculated on the total weight of the elastomer.

Furthermore, the use of the nano-sized polyurea particles and/or a dispersion of polyurea particles according to the invention is disclosed for increasing the compression hardness, tear strength and tensile stress in a flexible polyurethane foam having a free rise density lower than 100 kg/m³, in the range of 30-60 kg/m³

Furthermore, the use of the nano-sized polyurea particles and/or a dispersion of polyurea particles according to the invention is disclosed for increasing the tear strength and modulus (tensile stress) in polyurethane elastomers having a density in the range of 200-1200 kg/m³.

The independent and dependent claims set out particular and preferred features of the invention. Features from the dependent claims may be combined with features of the independent or other dependent claims as appropriate.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention.

DEFINITIONS

The following terms are provided solely to aid in the understanding of the invention.
1. Unless otherwise expressed, the isocyanate index, ISO index, NCO index or index refers to the ratio of NCO-groups over isocyanate-reactive hydrogen atoms present in a formulation, given as a percentage:

$$\frac{[NCO] \times 100}{[\text{Active hydrogen}]} (\%)$$

In other words the NCO-index expresses the percentage of isocyanate actually used in a formulation with respect to the amount of isocyanate theoretically required for reacting with the amount of isocyanate-reactive hydrogen used in a formulation.
2. Unless otherwise expressed, the expression "isocyanate-reactive hydrogen atoms" as used herein for the purpose of calculating the isocyanate index refers to the total of active hydrogen atoms in hydroxyl and amine groups present in the reactive compositions; this means that for the purpose of calculating the isocyanate index at the actual foaming process one hydroxyl group is considered to comprise one reactive hydrogen, one primary amine group is considered to comprise one reactive hydrogen and one water molecule is considered to comprise two active hydrogens.
3. The expression "polyurethane foam" as used herein refers to cellular products as obtained by reacting polyisocyanates with isocyanate-reactive hydrogen containing compounds, using foaming agents, and in particular includes cellular products obtained with water as reactive foaming agent.
4. Unless otherwise expressed, the weight percentage (wt %) of a component in a composition refers to the weight of the component over the total weight of the composition in which it is present, and expressed as percentage.
5. Unless otherwise specified, the ranges are inclusive, i.e. the values delimiting the range are included in the range specified.
6. Unless otherwise specified, equivalent diameter refers to the diameter of a spheric particle of equivalent volume or in other words the equivalent diameter size of an imaginary diameter of an imaginary sphere, which sphere has the same volume as the volume of the particle under consideration.
7. Unless otherwise specified, equivalent diameter particle size distribution is measured using Dynamic Light Scattering (DLS) and refers to the relationship of the particle size (equivalent diameter size) and its cumulative (weight) volume frequency by plotting the cumulative (weight) volume frequency (%) of the particles against its particle size (nm) and is expressed in this application as the ratio=$D_{90}$–$D_{10}$/$D_{50}$ (also referred to in literature as "relative span") wherein:
   $D_{90}$ refers to the equivalent diameter size where ninety percent of the cumulative weight volume has a smaller particle size and ten percent has a larger particle size or in other words the $90^{th}$ percentile of the cumulative volume weighted particle size distribution.
   $D_{50}$ refers to the equivalent diameter size where fifty percent of the distribution has a smaller particle size and fifty percent has a larger particle size or in other words the $50^{th}$ percentile of the cumulative volume weighted particle size distribution.
   $D_{10}$ refers to the equivalent diameter size where ten percent of the distribution has a smaller particle size and ninety percent has a larger particle size or in other words the $10^{th}$ percentile of the cumulative volume weighted particle size distribution.
8. Unless otherwise specified, polyurea particles according to the present invention and suitable for the applications according to the invention are limited to reaction products of at least an isocyanate component, a monoamine component and a diamine component and refer to particles comprising polyurea bondings and almost no urethane bondings.
9. Unless otherwise specified, density is measured on samples made under atmospheric conditions without use of auxiliary blowing agents and according to ISO 845.
10. Unless otherwise specified, tensile modulus (also referred to as tensile stress) is measured according to DIN 53504.
11. Unless otherwise specified, hardness is Compression Load Deflection (CLD) at 40% compression measured according to ISO 3386/1 with the proviso that the hardness is measured on dry and non-crushed samples during the first cycle.
12. Unless otherwise specified, tensile strength is measured according to ISO 1789
13. Unless otherwise specified, tear strength is measured according to ISO 8067.
14. Unless otherwise specified, the glass transition temperature (Tg) is measured in the re-heat cycle of a DSC experiment after heating to >220° C. at 20° C. per minute (above melting point if there is one), cooling to room temperature at 20° C. per minute and then reheating to >220° C. Nanoparticles useful in the invention have a Tg>100° C. measured according to the above protocol.
15. "nm" means nanometer, or $10^{-9}$ meter and "µm" means micrometer or $10^{-6}$ meter.
16. Unless otherwise specified, elastomeric polyurethanes are polyurethane materials which exhibit elastic or viscoelastic behaviour, i.e. which are capable of recovery from an applied stress. Polyurethane elastomers may be microcellular foamed materials or solids and may be thermoset or thermoplastic. Whilst there is no lower density limit for a microcellular elastomer typical useful densities in practice range from 200-1200 kg/m³.
17. Unless otherwise specified, flexible polyurethane foams are a class of elastomeric polyurethane materials typically characterised as having a low density, or in other words having a free rise density <100 kg/m³, preferably in the range of 30-60 kg/m³ cellular materials with a limited and reversible resistance to compression. flexible polyurethane foams are typically characterised as open cell, permeable to air and reversibly deformable (DIN7726). In case of moulded flexible foam (no free rise) then the density of the flexible foam can be >100 kg/m³, e.g. it may be in the range of 100-200 kg/m³.

DETAILED DESCRIPTION

The present invention will be described with respect to particular embodiments.

It is to be noticed that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could. Furthermore, the particular features or characteristics may be combined in any suitable manner in one or more embodiments, as would be apparent to one of ordinary skill in the art.

The present invention discloses particulate material and/or dispersions of particulate material in a suitable solvent (e.g. polyol) which are suitable for use as reinforcing agents in a process for making polyurethane comprising materials.

Said particulate material is in the form of fine polyurea particles, preferably having nano-size dimensions (nanoparticles) which are suitable for use as additives in the production process for making polyurethane comprising materials.

Suitable polyurea particles have equivalent diameter dimensions in the range of 50 nm up to 10 μm, in the range of 50 nm to 5 μm, such as in the range of 50 nm to 1 μm.

Preferably said polyurea particles have equivalent diameter dimensions in the nanosize range of 50 nm up to 700 nm Said polyurea particles may be used as performance modifiers in the production process for making polyurethane or polyisocyanurate comprising materials such as polyurethane flexible foams (slabstock or moulded) and polyurethane elastomers.

More particularly the polyurea particles are designed such that they may be added to formulations used to fabricate polyurethane comprising materials in order to improve mechanical properties such as tear strength, tensile stress and compression hardness.

The polyurea particles according to the invention are characterized as having a high Tg, a small equivalent diameter, a narrow particle size distribution (wherein the particle size is measured as equivalent diameter), and a high value for hardness which make them extremely suitable for use as reinforcement additives in polyurethane comprising products.

According to embodiments, a method for making polyurea nanoparticles as well as the polyurea nanoparticles and dispersions comprising said polyurea nanoparticles are disclosed.

Said nano-sized polyurea particles or dispersions of said polyurea particles have at least equivalent diameter dimensions in the nanosize range of 50 nm up to 700 nm, a narrow equivalent diameter particle size distribution, an amount of urethane bonds calculated on the total amount of urea+urethane bonds in said particles of <1%, and a glass transition temperature (Tg) of >100° C., preferably Tg>120° C., more preferably >150° C. measured in a second heating cycle after heating to >220° C. at 20° per minute using Differential Scanning calorimetry.

Said nano-sized polyurea particles or dispersions of said polyurea particles are ideally suitable for improving the mechanical properties of a polyurethane material.

A method for fabricating the polyurea particles is disclosed, said particles being suitable for use as additives in the production process for polyurethane materials such as polyurethane flexible foams and elastomers (as described above)

The polyurea particles according to the invention may be produced using a method comprising the steps of:

1. providing at least one polyisocyanate component optionally dissolved in a first solvent;
2. providing at least one isocyanate-reactive diamine component optionally dissolved in a second solvent;
3. providing at least one isocyanate-reactive monoamine, optionally dissolved in a third solvent;
4. combining said isocyanate-reactive monoamine component with said polyisocyanate component thereby forming an urea-modified polyisocyanate component optionally dissolved in said first solvent and/or said third solvent, and then
5. adding said urea-modified polyisocyanate component to said diamine component thereby forming the urea particles optionally dispersed in a solvent medium, said solvent medium comprising at least one of said first solvent, said second solvent and said third solvent.

A process for forming the urea particles according to the present invention may have the steps of A. Providing an isocyanate component and dissolve it in a suitable solvent (first solvent).
B. providing a monoamine component and optionally dissolve it in a suitable solvent (third solvent)
C. Providing a diamine component and dissolve it in a suitable solvent (second solvent)
D. Add the monoamine to the isocyanate solution while mixing. The speed of addition of the monoamine in the isocyanate solution, the monoamine concentration (in case of dissolved monoamine in a third solvent), the isocyanate concentration it the isocyanate solution and the mixing energy may be chosen to avoid to a large extent local high concentrations of the monoamine in the isocyanate solution. Preferably a low concentration of monoamine, high concentration of isocyanate, slow addition of the monoamine and a high mixing energy is selected.
E. Subsequently the diamine solution is added to the reaction product of isocyanate and monoamine made in D. Again, the addition speed of adding the diamine in the reaction mixture, the diamine concentration in the second solvent, the isocyanate concentration in the reaction mixture and the mixing energy may be chosen to avoid to a large extent local high concentrations of the diamine in the isocyanate solution. The most ideal conditions to achieve this are low concentration of the monoamine, high concentration of isocyanate/monoamine-adduct, slow addition of the diamine component and a high mixing energy.

The urea particles thus obtained using above disclosed method have equivalent diameter dimensions in the nanosize range of 50 nm up to 700 nm.

To achieve urea particles having nano-size dimension and a uniform equivalent diameter particle size distribution, the isocyanate-reactive monoamine component (optionally dissolved in a second solvent) has to be added to the polyisocyanate component (optionally dissolved in a first solvent), thereby forming an urea-modified polyisocyanate component optionally dissolved in said first solvent and said optionally third solvent. The monoamine compound is then acting as a kind of surfactant in the polyisocyanate component which is crucial for achieving individual nanosize polyurea particles after reaction with the diamine component (avoiding the formation of large polyurea particles). Said nano-size urea particles preferably have an equivalent diameter of only 50 nm up to 700 nm.

To fabricate said nano-sized polyurea particles, a specific selection of diamines has to be used in order to create polyurea particles having a narrow and uniform equivalent diameter particle size distribution and a hardness which is significantly higher than the hardness of the matrix to be reinforced being a standard polyurethane flexible foam or a polyurethane elastomer.

The diamine components to be used to fabricate the polyurea particles suitable for use as additives in a process for making flexible polyurethane foams and achieving reinforcement in said foams are specific diamines which can be represented by following general structure [3]:

[3]

Wherein
- q is an integer from 1 till 12, e.g. 1, 2, 3, 4, 5, 6, 7, 8, 9, 10, 11 or 12. Most preferably q is an integer from 1 till 6.
- $A_5$ may be a C1 to C12, more preferably a C1 up to C6 linear or branched aliphatic group,
- Alternatively $A_5$ may be one or more aromatic group, preferably 1-4 aromatic groups
- Alternatively $A_5$ may be an aryl-aliphatic wherein the aliphatic part is a C1 up to C6 and further comprises 1-4 aromatic groups
- Alternatively $A_5$ may be cyclo-aliphatic group of C3 up to C15
- $A_5$ may further comprise an ether group and/or one or more NH groups.

Preferably the diamine component is a diamine wherein q<4 and having a rather small structure. Preferred examples of suitable diamines include:

Jeffamine EDR104 having following structure [4]:

[4]

Octahydro-4,7-methano-1H-indenedimethylamine (TCD) having following structure [5]:

[5]

Ethylene diamine (EDA) having following structure [6]:

[6]

Also suitable diamines are DCH-99 (1,2 cyclohexane diamine, available from Huntsman), XTA-808 (1,4 bis[aminomethyl]cyclohexane, available from Huntsman), tricyclodecane diamine, hexamethylenediamine, neopentanediamine, diethyltoluenediamine and 4-methyl-1,2-phenylenediamine.

The diamine components may be dissolved in a second solvent. Said second solvent is preferably inert to the isocyanate component or may be a solvent in which the polyisocyanate component solves poorly, if soluble at all, though may as well be isocyanate reactive. The second solvent can be of protonic or non-protonic nature. Suitable solvents are non-protonic solvents such as e.g. acetone, 2-butanone, diethylether, tetrahydrofuran (also referred to as THF), methylethylketon, ethylacetate, pyridine, dioxane, 1,2-dimethoxyethane (also known as glyme or DME) and diethylene glycol dimethyl ether (also known as diglyme), acetonitrile, toluene, dimethylacetamide (also referred to as DMAC), dimethylformamide (also referred to as DMF), dimethyl sulfoxide (also referred to as DMSO). The second solvent may also be water.

Suitable polyisocyanate components used to form the urea particles according to the invention are polyisocyanates of the type $R—(NCO)_x$ with x at least 2 and R being an aromatic or aliphatic group, such as diphenylmethane, toluene, dicyclohexylmethane, hexamethylene, or a similar polyisocyanate, and mixtures thereof. Suitable polyisocyanate components are toluene diisocyanates (TDI), diphenylmethane diisocyanate (MDI)-type isocyanates, and prepolymers of these isocyanates. Preferably the polyisocyanates may have at least two aromatic rings in its structure, and are liquid products or liquefiable at the process temperature used, i.e. liquefiable at temperatures preferably of 40 deg C. or less. Polymeric isocyanates having a functionality greater than 2 may be used.

Examples of suitable polyisocyanate components are tolylene diisocyanate (also known as toluene diisocyanate, and referred to as TDI), such as 2,4 TDI and 2,6 TDI in any suitable isomer mixture, hexamethylene diisocyanate (HMDI or HDI), isophorone diisocyanate (IPDI), butylene diisocyanate, trimethylhexamethylene diisocyanate, di(isocyanatocyclohexyl)methane, e.g. 4,4'-diisocyanatodicyclohexylmethane ($H_{12}$MDI), isocyanatomethyl-1,8-octane diisocyanate and tetramethylxylene diisocyanate (TMXDI), 1,5-naphtalenediisocyanate (NDI), p-phenylenediisocyanate (PPDI), 1,4-cyclohexanediisocyanate (CDI), tolidine diisocyanate (TODI), any suitable mixture of these polyisocyanates, and any suitable mixture of one or more of these polyisocyanates with MDI in the form of its 2,4'-, 2,2'- and 4,4'-isomers and mixtures thereof (also referred to as pure MDI), the mixtures of diphenylmethane diisocyanates (MDI) and oligomers thereof (known in the art as "crude" or polymeric MDI), and reaction products of polyisocyanates (e.g. polyisocyanates as set out above, and preferably MDI-based polyisocyanates), with components containing isocyanate-reactive hydrogen atoms forming polymeric polyisocyanates or so-called prepolymers. An other suitable polyisocyanate is xylenediisocyanate.

The ratio of isocyanate groups in the polyisocyanate component (referred to as ISO-groups or reactive NCO groups) over the number of reactive hydrogens in the monoamine component (referred to as $H_{ma}$) is preferably in the range of 1.5 up to 120, more preferably in the range of 10 up to 70, most preferably in the range 20 up to 40.

Most preferably the ISO-index of the system used to form the polyurea particles (referring to the polyisocyanate component, the monoamine component and diamine component as a whole) is preferably in the range of 80 up to 120, more preferably in the range of 90 up to 110 and most preferably in the range of 99 up to 101.

The isocyanate component may (optionally) be dissolved in a first solvent. Suitable solvents include ketones such as acetone, tetrahydrofuran (THF), toluene, . . . . Also polyols may be suitable for use as first solvent but in that case the polyol and the isocyanate component may only be reactive on to the other at temperatures above the typical process temperature used according to the present invention, hence preferably reactive one to the other at temperatures above 60° C. In that case the weight percentage of the polyisocyanate component in the first solvent is in the range of 0.1 to 25 wt %, more preferred in the range of 0.1 to 12 wt %.

Preferably the monoamine components used to form the urea particles according to the invention are alkylpolyoxyalkyl monoamines and can be represented by following general structure [1]:

$A_1(-OA_2)_n(-OA_3)_m(-OA_4)_p—NH_2$ [1]

wherein
- $A_1$ typically is a C1 to C6 chain, most preferably a $CH_3$-group.
- $A_2$, $A_3$ and $A_4$ typically are mutually different C1 to C6 chains, most preferably at least one of them being a C2-chain, at least one being a branched C3-chain and at least one being a straight C3-chain.
- n, m and p independently are a positive integers, at least one of them being more than zero.

Alternatively $A_1$ may be $C_9H_{19}$-Ø-, wherein Ø is an aromatic C6-ring, e.g. Surfonamine B-100 of Huntsman International LLC.

The $OA_1$-, $OA_2$ and $OA_3$-groups may be distributed randomly (random alkoxy polymers) or may be present as one or more groups (block alkoxy copolymers).

Most preferred, the monoamine components are alkyl EO/PO copolymer monoamines, i.e. a copolymer of ethoxy-groups and propoxy-groups, either random or block copolymerized, which is terminated at one side of the chain by an alkyl group, typically methyl, and at the other side of the chain terminated by a primary amine group.

Typical examples are monoamines as sold by Huntsman International LLC under the name Jeffamine M-amines, such as Jeffamine M1000 and Jeffamine M 2070, Jeffamine M2005, Jeffamine M600 and Surfonamine L-300.

An example of a suitable monoamine according to the invention is Jeffamine M2005 which can be represented by following structure [2]:

[2]

Wherein x=6 and y=29 and x and y are randomly distributed.

According to some embodiments of the invention, only one monoamine is used.

According to some embodiments of the invention, a combination of different monoamine components is used. According to some embodiments of the present invention, at least one monoamine may be a primary amine group. According to other embodiments of the present invention, the at least one monoamine may be a secondary amine group.

The monoamine or monoamines can be used undiluted or undissolved. In case the monoamine or monoamines are dissolved in a third solvent, the weight percentage of the monoamine or monoamines together in the third solvent is in the range of 20 to 65 wt % more preferred in the range of 25 to 50 wt %. The third solvent may be identical to the first solvent. The third solvent, or one or more of the solvent components of this third solvent, may be water or a polyol. Alternatively the third solvent may be any suitable organic solvent such as ketones, e.g. acetone, 2-butanone, pyridine, dioxane, 1,2-dimethoxyethane (also known as glyme or DME) and diethylene glycol dimethyl ether (also known as diglyme), acetonitrile, dimethylformamide (also referred to as DMF), dimethyl sulfoxide (also referred to as DMSO) and tetrahydrofuran (also referred to as THF). The third solvent may be a polyol, similar or identical to the polyols suitable to provide the first and/or the second solvent.

Preferably the second solvent is a polyol. As an example, the second solvent may be polyol or a polyol mixture having average hydroxyl numbers of from 20 to 300, especially from 25 to 150 mg KOH/g, and hydroxyl functionalities of from 1.5 to 3, especially from 1.8 to 2.2, and a MW generally from 750 to 6000. Suitable polyols include reaction products of alkylene oxides, for example ethylene oxide and/or propylene oxide, with initiators containing from 2 to 8 active hydrogen atoms per molecule. Suitable initiators include: polyols, for example glycerol, trimethylolpropane, triethanolamine, pentaerythritol, sorbitol and sucrose; polyamines, for example ethylene diamine, tolylene diamine (TDA), diaminodiphenylmethane (DADPM) and polymethylene polyphenylene polyamines; and aminoalcohols, for example ethanolamine and diethanolamine; and mixtures of such initiators. Other suitable polyols include polyesters obtained by the condensation of appropriate proportions of glycols and higher functionality polyols with dicarboxylic or polycarboxylic acids. Still further suitable polymeric polyols include hydroxyl terminated polythioethers, polyamides, polyesteramides, polycarbonates, polyacetals, polyolefins and polysiloxanes. Mixtures may be used.

According to some embodiments of the present invention, the first and the second solvent may be identical. The first and second solvent may be polyols, optionally identical polyol. Preferably the first and second solvent are well soluble one into the other. The volumes of the first and second solvent may be chosen such that no saturation levels are met. Preferably the first and second solvent are miscible, i.e. one solvent can be mixed with the other solvent or solvents in any ratio.

In case a first, second and third solvent are used, said solvents are well soluble one into the other. The volumes of the first, second and third solvent may be chosen such that no saturation levels are met. Preferably the first, second and third solvent are miscible, i.e. one solvent can be mixed with the other solvent or solvents in any ratio.

The obtained dispersion of urea particles in a suitable solvent can be kept stable at normal storage circumstances, e.g. at room temperature, for a longer period of time.

To prepare the urea particles and dispersions comprising said urea particles, the necessity of energy input, e.g. by means of ultrasonication, high shear mixing, pressure in crease and/or heating can be minimized, even avoided.

The urea particles according to the invention may have a significant higher thermal stability compared to particles having bonds being substantially consisting of urethane bonds. They exhibit higher melting points and higher glass transition temperatures. This translates in a high hardness in a wide temperature range, which itself may be a useful property in applications such as reinforcing filler.

According to embodiments, the polyurea particles according to the invention may be added to formulations used to fabricate polyurethane materials or in other words the polyurea particles are used as additives in a polyurethane formation process. The polyurea particles are hence incorporated into the polyurethane matrix which has to be reinforced.

According to embodiments, said polyurethane matrix which has to be reinforced may be a flexible polyurethane foam and the polyurea particles of the invention are added during the processing (fabrication) of said foam in order to improve the mechanical properties such as tear strength and compression hardness in polyurethane flexible foams. In other words, flexible foams comprising the polyurea particles according to the invention have significant improved mechanical properties compared to standard flexible foams prepared using similar formulations and having similar densities.

Therefore, a process for preparing a flexible foam having improved mechanical properties is disclosed by reacting at an isocyanate-index of 70 to 130, preferably 80-120, most preferably 90-115:
- a polyisocyanate composition, and
- an isocyanate reactive composition, and
- polyurea particles or a dispersion of polyurea particles, and
- a blowing agent; and
- one or more catalysts, and optionally
- additives;

such that the amount (wt %) of polyurea particles in the obtained flexible foam is in the range of minimum 1% up to maximum 10 wt %, preferably in the range 1-5 wt % calculated on the total weight of the flexible foam calculated on the total weight of the flexible foam.

According to embodiments, said polyurethane matrix which has to be reinforced may be an elastomeric polyurethane material and the polyurea particles of the invention are added during the processing (fabrication) of said elastomer in order to improve the mechanical properties such as tear strength. In other words, elastomers comprising the polyurea particles according to the invention have significant improved mechanical properties compared to state of the art elastomers prepared using similar formulations and having similar densities.

Therefore, a process for preparing an elastomeric polyurethane material having improved mechanical properties is disclosed by reacting at an isocyanate-index of 70 to 130, preferably 80-120, most preferably 90-115
- a polyisocyanate composition, and
- an isocyanate reactive composition, and
- polyurea particles or a dispersion of polyurea particles, and
- optionally a blowing agent; and
- one or more catalysts, and optionally
- additives;

such that the amount (wt %) of polyurea particles in the obtained elastomer is in the range of minimum 0.5% up to maximum 10 wt %, more preferred 1 up to maximum 7 wt % calculated on the total weight of the elastomer.

Preferably, first a dispersion of polyurea particles is prepared in a suitable solvent. Said solvent may be selected from water, polyols, volatile solvents, . . . . Said dispersion of polyurea particles is then added to the isocyanate reactive composition (typical polyetherpolyols and/or polyesterpolyols) used to fabricate the polyurethane material (flexible foam or elastomer). The dispersion of polyurea particles having 0.5 wt % up to 50 wt % of particles, preferably 1 wt % up to 30 wt %, more preferably 5-20 wt %.

Most preferably, the solvent used to make up the dispersion of polyurea particles is selected from polyols. Said polyols may be different or identical in composition to the polyols (isocyanate reactive) suitable for the synthesis of the polyurethane material. At least the polyol used to for making the dispersion of polyurea particles is soluble in the polyol used as isocyanate reactive used to fabricate the polyurethane material (flexible foam or elastomer).

Alternatively first a dispersion of polyurea particles is prepared in a volatile solvent. In that case, the solvent used to make up the dispersion is removed after transferring the dispersion to the isocyanate reactive (polyol). The removal may performed by heating and/or any other method known in the art to remove solvents (depending on boiling point of solvent).

According to yet another alternative, the polyurea particles may be directly (synthetised) synthesised in the polyol composition used to fabricate the polyurethane flexible material (flexible foam or elastomer).

According to an embodiment, the dispersion of polyurea particles, the blowing agent and optionally further additives are present in the isocyanate reactive composition before adding (and reacting) to the isocyanate composition.

The polyurethane material (flexible foam or elastomer) is normally synthesised by mixing the isocyanate reactive composition (polyol) comprising the polyurea particles with appropriate quantities of a polyisocyanate composition (e.g. MDI and/or MDI-based prepolymers), water, surfactants and, optionally, cross-linkers and/or cell-openers.

Using an isocyanate reactive (polyol) composition comprising the polyurea particles of the present invention makes it possible to achieve a flexible polyurethane foam having a significant increased compression hardness, tensile strength and tear strength compared to a reference flexible foam normalised to the same density. A typical improvement of 10% up to 100% in hardness (for Compression Load Deflection values calculated at normalized densities) may be achieved by adding the polyurea particles of the present invention. A typical improvement of 10% up to 100% in tear strength may be achieved by adding the polyurea particles of the present invention Using an isocyanate reactive (polyol) composition comprising the polyurea particles of the present invention makes it possible to achieve polyurethane elastomers having a significant increased reinforcement compared to a reference polyurethane elastomer normalised to the same density. A typical improvement of 10% up to 100% in tear strength and an improvement of 10 up to 200% in tensile modulus may be achieved by adding the polyurea particles of the present invention The polyurea particles used to achieve increased compression hardness in flexible polyurethane foams and elastomers are polyurea particles having a high Tg value. The Tg value for the polyurea particles according to the invention is typically >100° C., preferably >120° C., more preferably >150° C. Said high glass transition temperature is possible due to the specific selection of monoamine components and more in particular the specific selection of diamine components, the ratio of isocyanates towards monoamines+diamine components as well as the processing sequence of bringing these ingredients together in order to form the polyurea particles.

The polyurea particles used to achieve increased compression hardness in flexible polyurethane foams and elastomers are polyurea particles having a hardness which is harder than the polyurethane flexible foam or elastomer matrix to be reinforced such that an increase in hardness is achieved when using the polyurea particles according to the invention during processing. The obtained hardness, the equivalent diameter and uniformity of the polyurea particles are crucial to achieve significant improvement in mechanical properties. Especially the fact that the polyurea particles have nano-size dimensions and a uniform size (equivalent diameter) distribution leads to significant effects because of the large surface area of the polyurea particles.

Preferably 1-15 wt % of polyurea particles are added to the isocyanate reactive (polyol) composition used to make the flexible foam or elastomer calculated on the total weight of the isocyanate reactive (polyol) composition comprising the polyurea particles.

According to an embodiment the polyurea particles may be synthetised in the isocyanate reactive composition beforehand by adding first a substoichiometric amount of an isocyanate component and a monoamine component to the isocyanate reactive composition, allowing the composition to form an urea-modified polyisocyanate component and then adding a selected diamine component to the isocyanate reactive composition in order to form the polyurea particles according to the invention in the isocyanate reactive composition. The isocyanate component used to form the polyurea particles may have equal or different structures compared to the isocyanate component of the isocyanate composition used to make up the foam. The polyurea particles are responsible for achieving reinforcement (hardness increase) in flexible foams and elastomers, said reinforcement is only observed when the polyurea particles are fabricated using a specific processing sequence and using a selected sub-family of diamine components. An example of an appropriate diamine is tricyclodecanediamine. The specific processing sequence (method) for forming the polyurea particles suitable for improving the mechanical properties of a flexible polyurethane foam is described more in detail below.

Suitable polyisocyanate compositions used to make up the flexible polyurethane foams and elastomers are polyisocyanates of the type R—(NCO)$_x$ with x at least 2 and R being an aromatic or aliphatic group, such as diphenylmethane, toluene, dicyclohexylmethane, hexamethylene, or a similar polyisocyanate, and mixtures thereof. Suitable polyisocyanate compositions are toluene diisocyanates (TDI), diphenylmethane diisocyanate (MDI)-type isocyanates, and prepolymers of these isocyanates. Preferably the polyisocyanates may have at least two aromatic rings in its structure, and are liquid products or liquefiable at the process temperature used, i.e. liquefiable at temperatures preferably of 40° C. or less. Polymeric isocyanates having a functionality greater than 2 may be used.

Examples of suitable polyisocyanate compositions are tolylene diisocyanate (also known as toluene diisocyanate, and referred to as TDI), such as 2,4 TDI and 2,6 TDI in any suitable isomer mixture, hexamethylene diisocyanate (HMDI or HDI), isophorone diisocyanate (IPDI), butylene diisocyanate, trimethylhexamethylene diisocyanate, di(isocyanatocyclohexyl)methane, e.g. 4,4'-diisocyanatodicyclohexylmethane (H12MDI), isocyanatomethyl-1,8-octane diisocyanate and tetramethylxylene diisocyanate (TMXDI), 1,5-naphtalenediisocyanate (NDI), p-phenylenediisocyanate (PPDI), 1,4-cyclohexanediisocyanate (CDI), tolidine diisocyanate (TODI), any suitable mixture of these polyisocyanates, and any suitable mixture of one or more of these polyisocyanates with MDI in the form of its 2,4',2,2' and 4,4' isomers and mixtures thereof (also referred to as pure MDI), the mixtures of diphenylmethane diisocyanates (MDI) and oligomers thereof (known in the art as "crude" or polymeric MDI), and reaction products of polyisocyanates (e.g. polyisocyanates as set out above, and preferably MDI-based polyisocyanates), with isocyanate-reactive hydrogen atoms forming polymeric polyisocyanates or so-called prepolymers. In case prepolymers are used, the NCO content of the prepolymer preferably lies in the range between 24 and 31 wt %, in particular within the range between 26 and 30 wt %.

Preferably the isocyanate composition is selected from diphenylmethane diisocyanate. Accordingly, useful polyisocyanates include pure 4,4'-diphenylmethane diisocyanate as well as mixtures of the latter isomer with the 2,2' and 2,4'-isomer. Also useful are the so-called crude diphenylmethane diisocyanate compositions, particularly those containing from 30 to 95%, preferably from 40 to 80% by weight of diphenylmethane diisocyanates, the remainder being largely polymethylene polyphenyl polyisocyanates of functionality greater than two. Also prepolymers made by reacting a substoichiometric amount of polyoxyalkylene diols or triols with a substantially pure diphenylmethane diisocyanate can be used. Such compositions have been fully described in the prior art.

The isocyanate reactive composition is preferably selected from polyoxyalkylene polyols such as polyoxyalkylene diols or triols and may be prepared by methods known in the art for preparing polyoxyalkylene polyols. Examples are diols or triols having ethylene oxide residues distributed in a random manner throughout the polyoxyalkylene chain which may be prepared by reacting a mixture of ethylene and propylene oxides with a compound containing two or three active hydrogen atoms in the molecule, for example a dihydric or trihydric alcohol. The hydroxyl equivalent weight of the polyoxyalkylene diol or triol is preferably in the range 1000 to 2000.

Preferred polyoxyalkylene polyols, referred to above as isocyanate reactive composition may be a polyoxypropylene polyol or a poly(oxypropylene-oxyethylene)polyol or a mixture thereof. Such polyols and methods for their preparation have been fully described in the prior art, many of them being commercially available. Examples of suitable polyols are polyoxyethylene-polyoxypropylene polyols having an average nominal hydroxyl functionality of 2-6.

Preferred polyether polyols which may be used include products obtained by the polymerisation of a cyclic oxide, for example ethylene oxide, propylene oxide, butylene oxide or tetrahydrofuran in the presence, where necessary, of polyfunctional initiators. Suitable initiator compounds contain a plurality of active hydrogen atoms and include water, butanediol, ethylene glycol, propylene glycol, diethylene glycol, triethylene glycol, dipropylene glycol, ethanolamine, diethanolamine, triethanolamine, toluene diamine, diethyl toluene diamine, phenyl diamine, diphenylmethane diamine, ethylene diamine, cyclohexane diamine, cyclohexane dimethanol, resorcinol, bisphenol A, glycerol, trimethylolpropane, 1,2,6-hexanetriol, pentaerythritol, sorbitol and sucrose. Mixtures of initiators and/or cyclic oxides may be used.

Preferred polyoxyalkylene polyetherpolyols, referred to above as isocyanate reactive composition include products obtained by the polymerisation of a cyclic oxide, for example ethylene oxide, propylene oxide, butylene oxide or tetrahydrofuran in the presence, where necessary, of polyfunctional initiators. Suitable initiator compounds contain a plurality of active hydrogen atoms and include water, butanediol, ethylene glycol, propylene glycol, diethylene glycol, triethylene glycol, dipropylene glycol, ethanolamine, diethanolamine, triethanolamine, toluene diamine, diethyl toluene diamine, phenyl diamine, diphenylmethane diamine, ethylene diamine, cyclohexane diamine, cyclohexane dimethanol, resorcinol, bisphenol A, glycerol, trimethylolpropane, 1,2,6-hexanetriol, pentaerythritol, sorbitol and sucrose. Mixtures of initiators and/or cyclic oxides may be used.

Alternatively, the isocyanate reactive composition may be selected from polyester polyols. Preferred polyester polyols include hydroxyl-terminated, reaction products of polyhydric alcohols such as ethylene glycol, propylene glycol, diethylene glycol, dipropylene glycol, 1,4-butanediol, bis (hydroxyethyl) terephthalate, glycerol, trimethylolpropane, hexanediol, neopentyl glycol, methylpentane diol, pentaerythritol or polyether polyols or mixtures of such polyhydric alcohols, and polycarboxylic acids, especially dicarboxylic acids or their ester-forming derivatives, for examples succinic, glutaric and adipic acids or their dimethyl esters, sebacic acid, phthalic anhydride, tetrachlorophthalic anhydride or dimethyl terephthalate or mixtures thereof.

The isocyanate reactive composition may also comprise a mixture of above cited polyoxyalkylene polyether polyols and polyester polyols.

The blowing agent used in making the flexible polyurethane foams may be water and may be used in an appropriate amount to give a foam of the desired density. It is appropriate to use from 1.0 to especially from 1.5 to 4.0%, by weight of water based on the weight of the polyoxyalkylene polyol.

Catalysts which may be used in making the foams have been fully described in the prior art and include tertiary amines and organic metal compounds, particularly tin compounds. Examples. of suitable tertiary amines-include N,N-dimethylcyclohexylamine, N,N-dimethylbenzylamine and N,N-dimethylethanolamine. Organic metal compounds which may be used as catalysts include stannous octoate and dibutyltin dilaurate. It is often advantageous to use a mixture of catalysts for example a mixture of amines or an amine and a tin compound.

Other conventional ingredients which may be mentioned include surfactants, for example siloxane-oxyalkylene copolymers, fillers, fire-retardants, pigments, dyes and additional blowing agents, for example trichlrofluoromethane.

The above compositions used to make up the foam-forming reaction mixture may be mixed together in any convenient manner, for example by using any of the mixing equipment described in the prior art for the purpose. If desired some of the mutually inert individual compositions may be pre-blended so as to reduce the number of component streams requiring to be brought together in the final mixing step, It is often convenient to have a two-stream system whereby one stream comprises the polyisocyanate composition (or alternatively the prepolymer) and the second comprises all the other ingredients of the reaction mixture.

Other conventional ingredients which may be mentioned include surfactants, for example siloxane-oxyalkylene copolymers, fillers, fire-retardants, pigments, dyes and additional blowing agents, for example trichlrofluoromethane.

The above compositions used to make up the reaction mixture may be mixed together in any convenient manner, for example by using any of the mixing equipment described in the prior art for the purpose. If desired some of the mutually inert individual compositions may be pre-blended so as to reduce the number of component streams requiring to be brought together in the final mixing step, It is often convenient to have a two-stream system whereby one stream comprises the polyisocyanate composition (or alternatively the prepolymer) and the second comprises all the other ingredients of the reaction mixture.

The independent and dependent claims set out particular and preferred features of the invention. Features from the dependent claims may be combined with features of the independent or other dependent claims as appropriate.

The above and other characteristics, features and advantages of the present invention will become apparent from the following detailed description which illustrates, by way of example, the principles of the invention. This description is given for the sake of example only, without limiting the scope of the invention.

The invention is illustrated with the following examples.

EXAMPLES

In the examples under, the following products are used:

Jeffamine® M2005, being a polyether monoamine with a propyleneoxide/ethyleneoxide mol ratio of 29/6, obtained from Huntsman.

Jeffamine® D230, being a difunctional, primary amine with an oxypropylene backbone and average molecular weight of 230 g/mol, obtained from Huntsman.

TCD-diamine, or 3(4),8(9)-bis(aminomethyl)-tricyclo-5,2,1,0(exp2.6) decane, obtained from Oxea Chemicals.

Daltocel® F477 being glycerol initiated EO end-tipped polypropylene oxide polyol with 15% EO, a functionality of 2.4, OHv 28 mgKOH/g, and an average mole weight of 6000. Daltocel F477 is obtained from Huntsman.

Suprasec® 2433 being a prepolymer containing 19.0 wt/wt % of isocyanate-groups, prepared from 54.3 wt/wt % of pure 4,4'-diphenylmethanediisocyanate, 6 wt/wt % of uretonimine-modified 4,4'-diphenylmethanediisocyanate and 39.7 wt/wt % of Daltocel F481, a difunctional polypropyleneoxide polyol tipped with a total of 15.0 wt/wt % polyethyleneoxide. Suprasec 2433 is obtained from Huntsman Dabco® 25S, a polyurethane catalyst obtained from Air Products.

XTA-808, or 1,4-bis-(aminomethyl)-cyclohexane, being a cycloaliphatic diamine obtained from Huntsman Example 1: Synthesis of Polyurea (Nano)Particles According to the Invention for Use in Process for Making Polyurethane Elastomers A. Synthesis of a Daltocel® F477 Polyol Filled with 9.59 wt % of Polyurea Particles.

40.0 g of 4,4'-diphenylmethanediisocyanate (Huntsman) was diluted in 397.63 g of Daltocel® F477 cooled down to 5° C. Shortly after a mixture of 35.01 g of Jeffamine® M2005 in 176.66 g of Daltocel® F477 was added over the course of 5 minutes. Again shortly after a blend of 30.05 g of TCD-diamine diluted in 398.55 g of Daltocel® F477 was added over the course of 10 minutes. After the synthesis was completed a FTIR-analysis on the filled polyol showed marginal quantities of urethane-bonds compared to large quantities of urea-bonds, evidencing a limited reaction of isocyanate with hydroxyl-groups of the polyol under the current circumstances. Dynamic light scattering particle sizing shows the formation of polyurea nanoparticles with a cumulant average particle size of 252 nm and volume median particle size of 155 nm.

B. Synthesis of a Reference Polyurethane Elastomer.

In a cardboard cup 63.0 g of Daltocel F477, 56.92 g of Suprasec 2433 prepolymer, 9.58 g of 1,4-butanediol and 0.39 of Dabco® 25S were weighed. The chemicals were mixed for 30 seconds using a vacuum mixer. After mixing the reaction mixture was poured in an open mould preheated to 120° C. by a heating plate. After curing on the heating plate for 30 minutes the polyurethane casting was transferred to an oven set at 80° C. for further curing during 16 hours. The elastomer has a DIN 53504 tensile strength of 9.2 MPa, a DIN 53504 tensile stress at 100% strain of 4.9 MPa and a DIN 53507 mean tear strength of 10.2N/m.

C. Synthesis of a Polyurethane Elastomer Filled with Polyurea Particles

In a cardboard cup 69.0 g of Daltocel F477 filled with 9.59 wt/wt % of polyurea particles as prepared in A, 56.92 g of Suprasec® 2433 prepolymer, 9.58 g of 1,4-butanediol and 0.39 of Dabco® 25S were weighed. The chemicals were mixed for 30 seconds using a vacuum mixer. After mixing the reaction mixture was poured in an open mould preheated to 120° C. by a heating plate. After curing for 30 minutes on the heating plate the polyurethane casting was transferred to an oven set at 80° C. for further curing during 16 hours. The elastomer has a DIN 53504 tensile strength of 9.8 MPa, a DIN 53504 tensile stress (modulus) at 100% strain of 6.4 MPa and a DIN 53507 mean tear strength of 15.7 N/m.

Example 2: Synthesis of Polyurea (Nano)Particles According to the Invention for Use in Process for Making Polyurethane Elastomers A. Synthesis of a Daltocel F477 Polyol Filled with 11.96 wt % of Polyurea Particles.

Polyol 1: 36.45 g of 4,4'-diphenylmethanediisocyanate (Huntsman) was diluted in 241.85 g of Daltocel® F477 cooled down to 5° C. Shortly after a mixture of 7.21 g of Jeffamine® M2005 dissolved in 21.62 g of Daltocel® F477 was added over the course of 3 minutes. Again shortly after a blend of 16.43 g of 1,2-cyclohexanediamine diluted in 147.89 g of Daltocel® F477 was added over the course of 6 minutes. After the synthesis was completed a FTIR-analysis on the filled polyol showed marginal quantities of urethane-bonds compared to large quantities of urea-bonds, evidencing a limited reaction of isocyanate with hydroxyl-groups of the polyol under the current circumstances. Dynamic light scattering particle sizing shows the formation of polyurea nanoparticles with a volume median particle size of 96 nm.

Polyol 2: 36.43 g of 4,4'-diphenylmethanediisocyanate (Huntsman) was diluted in 270.81 g of Daltocel® F477 cooled down to 5° C. Shortly after a mixture of 7.19 g of Jeffamine® M2005 in 21.89 g of Daltocel® F477 was added over the course of 3 minutes. Again shortly after a blend of 16.48 g of 1,2-cyclohexanediamine diluted in 148.31 g of Daltocel® F477 was added over the course of 3 minutes. After the synthesis was completed a FTIR-analysis on the filled polyol showed marginal quantities of urethane-bonds compared to large quantities of urea-bonds, evidencing a limited reaction of isocyanate with hydroxyl-groups of the polyol under the current circumstances. Dynamic light scattering particle sizing shows the formation of polyurea nanoparticles with a volume median particle size of 114 nm. Polyol 1 and Polyol 2 were combined and the resulting polyol blend was named Polyol 3.

B. Synthesis of a Reference Polyurethane Elastomer.

In a cardboard cup 81.96 g of Daltocel® F477, 58.00 g of Suprasec® 2433 prepolymer, 9.88 g of 1,4-butanediol and 0.19 g of Dabco® 25S were weighed. The chemicals were mixed for 30 seconds using a vacuum mixer. After mixing the reaction mixture was poured in an open mould preheated to 90° C. by a heating plate. After curing on the heating plate for 30 minutes the polyurethane casting was transferred to an oven set at 80° C. for further curing during 16 hours. Dynamic mechanical properties were measured using a TA Q800 fitted with a single cantilever clamp. Sample dimensions were 6 mm in width and 8 mm in length. The sample thickness was approximately 4 mm. The oscillation frequency was set at 1 Hz, the amplitude at 5 micrometers and the heating rate at 3° C./min. The measured storage modulus at 25° C. was 12.51 MPa. The tan delta at 25° C. was 0.1079.

C. Synthesis of a Polyurethane Elastomer Filled with Polyurea Particles

In a cardboard cup 85.58 g of Polyol 3 as prepared in A, 0.36 g of Daltocel F466, 56.92 g of Suprasec® 2433 prepolymer, 9.44 g of 1,4-butanediol and 0.2 of Dabco 25S were weighed. The chemicals were mixed for 30 seconds using a vacuum mixer. After mixing the reaction mixture was poured in an open mould preheated to 90° C. by a heating plate. After curing for 30 minutes on the heating plate the polyurethane casting was transferred to an oven set at 80° C. for further curing during 16 hours. Dynamic mechanical properties were measured using a TA Q800 fitted with a single cantilever clamp. Sample dimensions were 6 mm in width and 8 mm in length. The sample thickness was approximately 4 mm. The oscillation frequency was set at 1 Hz, the amplitude at 5 micrometers and the heating rate at 3° C./min. The measured storage modulus at 25° C. was 42.11 MPa. The tan delta at 25° C. was 0.1138.

Example 3: Polyurea (Nano)Particles According to the Invention for Use in Process for Making Polyurethane Flexible Foam A. Synthesis of a Daltocel F477 Polyol Filled with 12.50 wt/wt % of Polyurea Particles.

99.95 g of 4,4'-diphenylmethanediisocyanate (Huntsman) was diluted in 856.32 g of Daltocel® F477 cooled down to 10° C. Shortly after a mixture of 76.27 g Jeffamine M2005 in 228.80 g of Daltocel® F477 was added over the course of 5 minutes. Again shortly after a blend of 73.93 g of TCD-diamine diluted in 665.37 g of Daltocel® F477 was added over the course of 7 minutes. After the synthesis was completed a FTIR-analysis on the filled polyol showed marginal quantities of urethane-bonds compared to large quantities of urea-bonds. Dynamic light scattering particle sizing confirmed the formation of polyurea nanoparticles with a cumulant average particle size of 440 nm and volume median particle size of 125 nm.

B. Preparation of a Water-Blown Reference Flexible Polyurethane Foam

A reference flexible polyurethane foam was prepared using 275 g of Daltocel F477, 4.31 g of a two-functional polyethyleneoxide polyol, 188.1 g of a prepolymer containing 2,4'-diphenylmethanediisocyanate, 4,4'-diphenylmethanediisocyanate and polymeric isocyanate, 2.75 g of a catalyst blend, 1.38 g silicone surfactant, 1.23 g diethanolamine as chain-extender and 9.50 g water as blowing agent. All chemicals were mixed in a polypropylene-cup with a high speed laboratory mixer before being poured in a bucket, were the foam was allowed to rise freely. On a center-piece measuring 5*10*10 cm, cut from the 5 L foam, the following properties were measured: density: 39.7 kg/m$^3$; The ISO 3386 compression load deflection at 40% strain normalised to a density of 40 kg/m$^3$: 4.23 kPa. The measured ISO 1789 tensile strength is 97 kPa and the ISO 8067 mean tear strength is 169 N/m.

C. Preparation of a Water-Blown Flexible Foam Filled with Polyurea Particles

A flexible polyurethane foam filled with polyurea particles was prepared using 96.62 g of Daltocel F477, 202.73 g of a the Daltocel® F477 polyol filled with 12.50 wt/wt % of polyurea particles, 4.17 g of a two-functional polyethyleneoxide polyol, 187.95 g of a prepolymer containing 2,4'-diphenylmethanediisocyanate, 4,4'-diphenylmethanediisocyanate and polymeric isocyanate, 2.09 g of a catalyst blend, 1.38 g of silicone surfactant, 1.27 g diethanolamine as chain-extender and 9.56 g water as blowing agent. All chemicals were mixed in a polypropylene-cup with a high speed laboratory mixer before being poured in a bucket, were the foam was allowed to rise freely. On a center-piece measuring 5*10*10 cm, cut from the 5 L foam, the following properties were measured: density: 47.6 kg/m$^3$; The ISO 3386 compression load deflection at 40% strain normalised to a density of 40 kg/m$^3$: 5.49 kPa. The measured ISO 1789 tensile strength is 138 kPa and the ISO 8067 mean tear strength is 280 N/m.

Example 4: Measurement of Glass Transition Temperature of Polyurea (Nano)Particles According to the Invention Differential scanning calorimetry (DSC) has been performed with holed aluminum hermetic pan. The heating and cooling rate is 20° C./min and nitrogen flow of 50 cm3/min as inert atmosphere. In Table 1 the first and the second heating cycle for polyurea nanoparticles fabricated using TCD (Octahydro-4,7-methano-1H-indenedimethylamine) and EDA (ethylene diamine) as diamine component are listed. Three diamine/monoamine molar ratios have been assessed for each diamine type: 20, 40 and 70. The molar ratio of diamine/monoamine is indicated after the diamine component tradename, for example EDR104-20 refers to a ratio of diamine:monoamine of 20. A glass transition is measured around 230° C. and for some of the nanoparticles there was no Tg measured because the value was outside the spectrum.

TABLE 1

Transition temperature for the 1st and 2nd heating cycles (TCD-EDA)

| sample | 1$^{st}$ heating cycle (° C.) Tg | 2$^{nd}$ heating cycle (° C.) Tg |
|---|---|---|
| TCD-20 | 68 | 233 |
| TCD-40 | 68 | 232 |
| TCD-70 | 68 | 233 |
| EDA-20 | 62 | — |
| EDA-40 | 64 | — |
| EDA-70 | 68 | — |

Example 5: Measurement of Morphology of Polyurea Particles According to the Invention by Scanning Electron Microscopy (SEM)

Scanning Electron Microscopy was performed (on dried powder of nanoparticles) to collect information on the size of the particles. Three diamine/monoamine molar ratios have been assessed for each diamine type: 20, 40 and 70. The molar ratio of diamine/monoamine are indicated in Table 2. The ranges in Table 2 are expressed as a minimum and a maximum observed equivalent diameter size (nm) not taking the distribution into account (the smallest particles represent >90% of the total amount of the particles).

TABLE 2

Particles dimension measured by SEM. Minimum and maximum observed particle size is given

| | Measurement Technique = SEM (nm) | | |
|---|---|---|---|
| Sample | 20 | 40 | 70 |
| EDR 104 | 30-200 | 30-200 | — |
| D230 | — | — | — |
| TCD | 30-150 | — | 50-200 |
| EDA | 50-250 | 50-250 | 50-250 |

Figure 1:
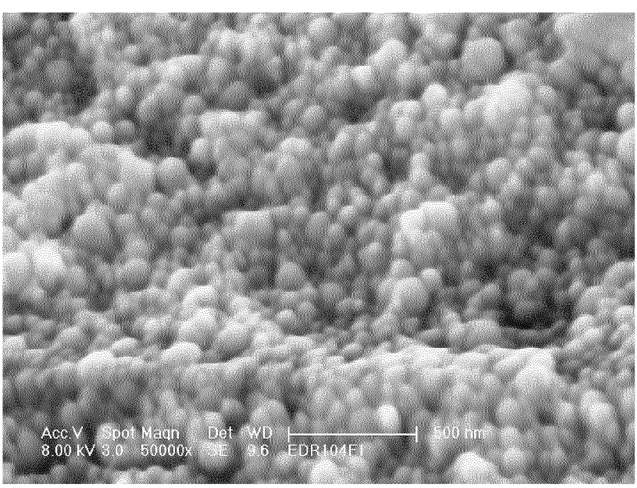
FIG. 1 is a SEM picture of polyurea particles formed from diamine components EDR104-20 and EDR104-40.

In SEM picture for polyurea particles using diamine components EDR104-20 and EDR104-40 (FIG. 1), it can be clearly seen that nanoparticles are successfully synthesized. The particles dimension is within 30-200 nm range (Table 2) with a round shape. No differences, in terms of size and shape are observed between the molar ratio 20 and 40.

It is to be understood that although preferred embodiments and/or materials have been discussed for providing embodiments according to the present invention, various modifications or changes may be made without departing from the scope and spirit of this invention.

Example 6: Synthesis of Polyurea (Nano)Particles According to the Invention for Use in Process for Making Polyurethane Elastomers A. Synthesis of Daltocel F477 Polyols Filled with Polyurea Particles.

Polyol 4 was prepared as follows: 30.34 g of 4,4'-diphenylmethanediisocyanate was diluted in 113.24 g of Daltocel® F477 and cooled down to 5° C. Shortly after a mixture of 23.27 g of Jeffamine® M2005 dissolved in 69.82 g of Daltocel® F477 was added over the course of 3 minutes. Again shortly after a blend of 26.59 g of Jeffamine® D-230 diluted in 239.30 g of Daltocel® F477 was added over the course of 9 minutes. After the synthesis was completed FTIR-analysis on the filled polyol showed marginal quantities of urethane-bonds compared to large quantities of urea-bonds, evidencing a limited reaction of isocyanate with hydroxyl-groups of the polyol under the current circumstances. Dynamic light scattering particle sizing shows a monomodal distribution and results in the following percentiles obtained from the calculated cumulative volume weighted particle size distribution: $D_{10}$=88 nm; $D_{50}$=141 nm; $D_{90}$=280 nm. This results in a relative span of 1.36. DSC experiments were performed on isolated particles on a TA Q100 instrument calibrated with Zinc and Indium. The thermal protocol consists of a heating/cooling/heating cycle. The samples were brought to the start point of −70° C. heated up to 250° C., cooled down (−70° C.) and heated again (250° C.) at the rate of 20° C./min. Using this procedure a glass transition temperature of 92° C. was measured in the second heating cycle.

Polyol 5 was prepared as follows: 34.8 g of 4,4'-diphenylmethanediisocyanate (Huntsman) was diluted in 171.95 g of Daltocel F477 and cooled down to 5° C. Shortly after a mixture of 26.49 g of Jeffamine® M2005 in 79.47 g of Daltocel® F477 was added over the course of 6 minutes. Again shortly after a blend of 18.95 g of XTA-808 diluted in 170.52 g of Daltocel® F477 was added over the course of 5 minutes. After the synthesis was completed FTIR-analysis on the filled polyol showed marginal quantities of urethane-bonds compared to large quantities of urea-bonds, evidencing a limited reaction of isocyanate with hydroxyl-groups of the polyol under the current circumstances. Dynamic light scattering particle sizing shows a monomodal distribution and results in the following percentiles obtained from the calculated cumulative volume weighted particle size distribution: $D_{v10}$−111 nm; $D_{v50}$−168 nm; $D_{v90}$−318 nm. This results in a relative span of 1.23. Using DSC a glass transition temperature of 225° C. was measured in the second heating cycle.

B. Synthesis of a Polyurethane Elastomer Filled with Particles Based on Jeffamine D230

In a cardboard cup 52.96 g of Polyol 4 as prepared in A, 31.64 g of Daltocel F466, 55.84 g of Suprasec® 2433 prepolymer, 9.39 g of 1,4-butanediol and 0.20 of Dabco® 25S were weighed. The chemicals were mixed for 45 seconds using a vacuum mixer. After mixing the reaction mixture was poured in an open mould preheated to 90° C. by a heating plate. After curing for 30 minutes on the heating plate the polyurethane casting was transferred to an oven set at 80° C. for further curing during 16 hours. The total filler loading in the elastomer was 5.6 wt/wt %, equivalent to 4.0 wt/wt % polyurea. Dynamic mechanical properties were measured using a TA Q800 fitted with a single cantilever clamp. Sample dimensions were 6 mm in width and 8 mm in length. The sample thickness was approximately 4 mm. The oscillation frequency was set at 1 Hz, the amplitude at 5 micrometers and the heating rate at 3° C./min. The measured storage modulus at 25° C. was 20.85 MPa. The tan delta at 25° C. was 0.1178. The Shore A hardness measured according to DIN 53505 was 78.

C. Synthesis of a Polyurethane Elastomer Filled with Particles Based on XTA-808.

In a cardboard cup 56.04 g of Polyol 5 as prepared in A, 28.73 g of Daltocel F466, 55.62 g of Suprasec® 2433 prepolymer, 9.60 g of 1,4-butanediol and 0.18 of Dabco® 25S were weighed. The chemicals were mixed for 45 seconds using a vacuum mixer. After mixing the reaction mixture was poured in an open mould preheated to 90° C. by a heating plate. After curing for 30 minutes on the heating plate the polyurethane casting was transferred to an oven set at 80° C. for further curing during 16 hours. The total filler loading in the elastomer was 6.0 wt/wt %, equivalent to 4.0 wt/wt % of polyurea. The measured storage modulus using DMTA was 30.56 Mpa at 25° C. The tan delta at 25° C. was 0.0977. The Shore A hardness measured according to DIN 53505 was 90.

The invention claimed is:

1. A method for making nano-sized polyurea particles or a dispersion of said polyurea particles having an equivalent diameter in the range of 50 nm up to 700 nm, a narrow equivalent diameter particle size distribution wherein the relative span $d_{90}-d_{10}/d_{50}<3$, a ratio of urea bonds to urethane bonds in said particles of at least 90:10, and a glass transition temperature (Tg) of >100° C., measured in a second heating cycle after heating to >220° C. at 20° per minute using Differential Scanning Calorimetry, said method comprising the steps of combining an isocyanate-reactive monoamine component with a polyisocyanate component thereby forming an urea-modified polyisocyanate component optionally dissolved in a solvent, and then adding said urea-modified polyisocyanate component to a diamine component thereby forming polyurea particles optionally dispersed in a solvent characterized in that the diamine component is selected from components corresponding to structure [2]:

Wherein
q is an integer smaller than 4,
$A_5$ may be a C2, C3 or branched C3 group,
$A_5$ may be one or more aromatic group,
$A_5$ may be an aryl-aliphatic wherein the aliphatic part is a C1 up to C6 and further comprises 1-4 aromatic groups,
$A_5$ may be cyclo-aliphatic group of C3 up to C15 and
$A_5$ may further comprise an ether group and/or one or more NH groups.

2. The method according to claim 1, wherein the diamine component is selected from ethylenediamine, tricyclodecanediamine, hexamethylenediamine, neopentanediamine, diethyltoluenediamine, 4-methyl-1,2-phenylenediamine.

3. The method according to claim 1, wherein the monoamine components are alkylpolyoxyalkyl monoamines represented by following general structure [1]:

wherein
$A_1$ is a C1 to C6 chain,
$A_2$, $A_3$ and $A_4$ are mutually different C1 to C6 chains, and
n, m and p independently are a positive integers.

4. The method according to claim 1, wherein the monoamine components are alkylpolyoxyalkyl monoamines represented by following general structure [1]:

wherein $A_1$ is $C_9H_{19}$-Ø-, wherein Ø is an aromatic C6-ring.

5. The method according to claim 1, wherein the ratio of isocyanate groups in the polyisocyanate component calculated over the total number of reactive hydrogens in the monoamine component and diamine component is in the range of 80 up to 120.

6. The method according to claim 1, wherein the ratio of isocyanate groups in the polyisocyanate component over the number of primary and secondary amine groups in the monoamine component is in the range of 1.6 up to 120.

7. The method according to claim 1, wherein suitable solvents include ketones such as acetone, tetrahydrofuran (THF), toluene, and polyols which are reactive towards isocyanates at temperatures above 60° C.

8. The method according to claim 1, wherein the dispersion of polyurea particles has 0.5 wt % up to 50 wt % of particles in a suitable solvent.

9. The method according to claim 1, wherein the relative span $d_{90}-d_{10}/d_{50}$ is <2.5.

10. The method according to claim 1, wherein the glass transition temperature ($T_g$) is >120° C.

11. The method according to claim 1, wherein the glass transition temperature ($T_g$) is >150° C.

12. The method according to claim 1, wherein the ratio of urea bonds to urethane bonds is 99:1.

13. The method according to claim 5, wherein the ratio of isocyanate groups in the polyisocyanate component calculated over the total number of reactive hydrogens in the monoamine component and diamine component ranges from 90 up to 110.

14. The method according to claim 5, wherein the ratio of isocyanate groups in the polyisocyanate component calculated over the total number of reactive hydrogens in the monoamine component and diamine component ranges from 99 up to 101.

15. The method according to claim 6, wherein the ratio of isocyanate groups in the polyisocyanate component calculated over the total number of reactive hydrogens in the monoamine component and diamine component ranges from 10 up to 70.

16. The method according to claim 6, wherein the ratio of isocyanate groups in the polyisocyanate component calculated over the total number of reactive hydrogens in the monoamine component and diamine component ranges from 20 up to 40.

17. The method according to claim 8, wherein the dispersion of polyurea particles has 1 wt % up to 30 wt % of particles in a suitable solvent.

18. The method according to claim 8, wherein the dispersion of polyurea particles has 5 wt % to 20 wt % of particles in a solvent.

\* \* \* \* \*